(No Model.)
A. CARRIER.
LATH SAWING MACHINE.
No. 289,219. Patented Nov. 27, 1883.
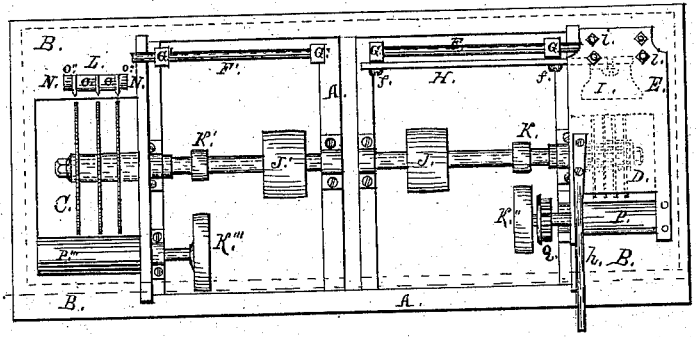
Fig. 1.
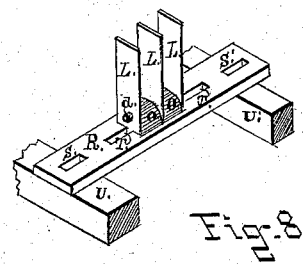
Fig. 8.
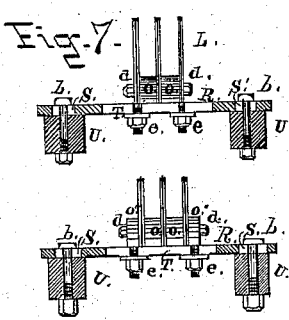
Fig. 7.
Fig. 6.
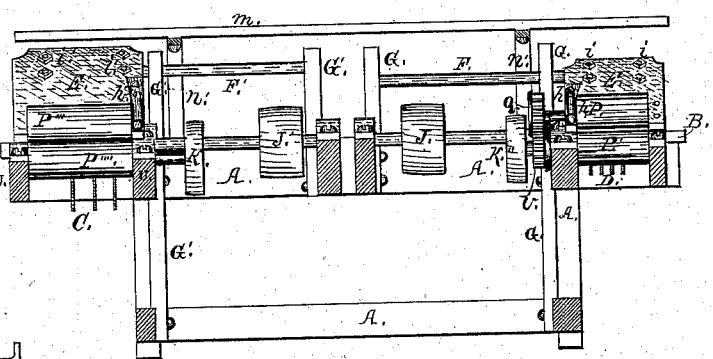
Fig. 2.
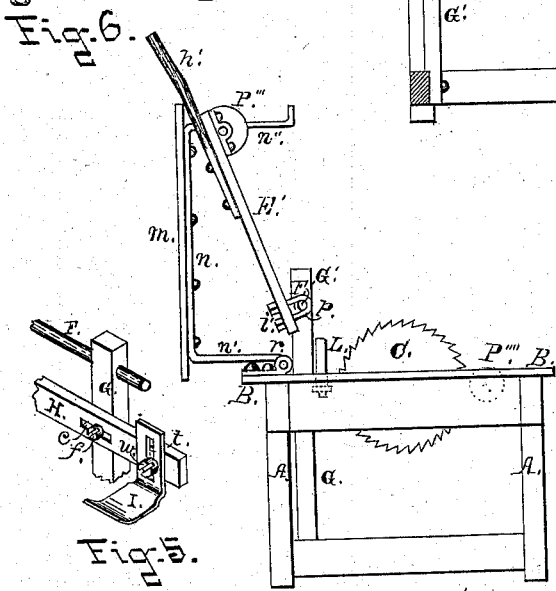
Fig. 5. Fig. 4.
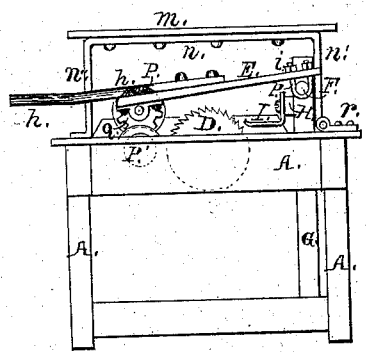
Fig. 3.
ATTEST:
M. R. Thomas
A. Thomas
INVENTOR:
Arthur Carrier
by his atty
James E. Thomas

UNITED STATES PATENT OFFICE.

ARTHUR CARRIER, OF BAY CITY, MICHIGAN.

LATH-SAWING MACHINE.

SPECIFICATION forming part of Letters Patent No. 289,219, dated November 27, 1883.

Application filed August 14, 1883. (No model.)

*To all whom it may concern:*

Be it known that I, ARTHUR CARRIER, a citizen of Canada, and a subject of Great Britain, and residing in the city of Bay City, and county of Bay, and State of Michigan, have invented a new and useful Improvement in Lath Bolting and Sawing Machines, of which the following is a specification.

My invention relates to improvements in lath sawing and bolting machines, in which a slab of a proper length to form a lath is passed through a gang of three or more circular saws, arranged for making the thickness of the bolts a proper dimension for forming the width of the lath, and these bolts are then passed through another gang of circular saws, which forms the bolt into a number of laths of the required dimension; and the objects of my invention are to provide a means of holding the slab or bolt firmly to the table while it is being sawed, and also of preventing the operator from being injured by pieces or edging being thrown back by the saw, and to provide a convenient and easy means of getting at the saws for cleaning out any piece or sliver that may get fast in the saws, and for taking the saws off the arbor for filing or changing, &c. I attain these objects by means of the mechanism illustrated in the accompanying drawings, in which—

Figure 1 is a top view of a lath bolting and sawing machine embodying my invention, and has the upper portion or cover, which forms a table, removed to show the mechanism beneath. Fig. 2 is a vertical section of the frame at the dotted line *x x*, and also showing a front view of the upper table or cover, which is omitted in Fig. 1. Fig. 3 is an end view of that portion containing the gang of lath-saws, and shows the top or cover and press-roller frame and upper cover or table in position for work. Fig. 4 is an end view of that part containing the bolting-saws, and shows the cover or upper table, and also the press-roller and frame, thrown back, so that the saws may be removed or cleaned. Fig. 5 is a detached view of a pressure-foot used in rear of the lath-saws. Figs. 6, 7, and 8 are detached views of a spreader, which is attached to the machine just back of and in line with the bolting-saws.

A represents the frame of a machine, containing a gang of saws for cutting the slab into bolts, and also at the opposite end a gang of saws for cutting the bolts into lath.

B is a bed or table, on which the pieces rest while being cut. C is a gang of saws placed the proper distance apart, and held in position on the saw-arbor by collars placed between the saws.

D is a gang of saws for cutting the bolts into lath, and is placed at the end opposite the saws C.

E represents a frame made close and solid, preferably of cast-iron, and of such width that when in position over the saws it will cover the saws completely, and at the front end it is provided with suitable boxes, in which rest the bearings of the press-roller P, and at the opposite end and back of the saws it is firmly secured to the shaft F by the clips *p*, which pass around the shaft F and through the frame E, and are secured thereto by the nuts *i*.

G are perpendicular pieces bolted to the frame A, and, extending above the top of the table B, serve to support the shaft F, which passes through the pieces G at the required height, and at the same time allows the shaft F to rotate when the front end of the frame E is raised up, as shown in Fig. 4. In front of the saws D and C are located the feed-rollers P' and P''', which are driven by the pulleys K'' and K'''. These rollers serve to feed the pieces to the saws while cutting. On the shaft of the roller P', and near the pulley K'', is placed the pinion V, and on the shaft of the press-roller P, and arranged to engage with the pinion V, is the pinion Q, which serves to rotate the press-roller P and assist in feeding the material to the saws, and at the same time allows the roller P and the front end of the frame E to be lifted up for uncovering the saws.

H is a handle or lever, which is firmly bolted to the frame E and extends forward a suitable distance, and is used for lifting the frame and press-roller. This frame E being constructed solid, and placed over the saws and the press-roller P in front of the saws, forms a shield, which prevents danger of pieces or slivers and sawdust being thrown forward, and avoids danger to the operator of the machine. Just back of the gang of lath-saws D is placed a pressure-foot, I, for holding the sawed lath firmly to the bed or table B. This pressure-foot I is constructed as shown in the detached view, Fig. 5, and consists of a foot, I, slightly turned up on the front end, so the pieces will easily pass beneath, and the back end is turned up at right angles with the foot and provided with the slot $t$, through which and into the cross-piece H passes the bolt W. This cross-piece H is provided with the slot $c$. The bolts $f$, passing through the slots $c$ and into the upright pieces G, secure and hold the cross-piece H in the required position. The slots $c$ allow the cross-piece H to be adjusted laterally by loosening the bolts $f$, and the slot $t$ allows the pressure-foot to be raised or lowered to conform to the size of the material being cut. A spreader is placed just back of the gang of bolting-saws C, and consists of plates of steel of a number corresponding to the number of saws in the gang, placed upright and in a direct line with the said saws, and are held in position by a bolt, $d$, passing through the pieces L, and also passing through the dividing-pieces O, which are placed between the plates L, and also through the outside pieces, O''.

In Figs. 6, 7, and 8, R is a plate, which is secured to the bed-pieces U of the frame A by the bolts $b$ passing through the slots S, provided for that purpose, and held thereto by a nut beneath the bed-pieces U. This plate R is also provided with a slot, T, through which pass the bolts $e$, at the upper end of which are attached the outside pieces, O''; or the lower end of the plates L may be drawn out and serve for the bolts, as shown in the detached views, Figs. 7 and 8, the lower end of either being provided with a nut beneath the plate R. The slots S admit of a lateral adjustment of the plate R by loosening the bolts $b$, and the slot T admits of a lateral adjustment of the spreader-plates L by changing the dividing-pieces O to others of a suitable width corresponding to the width of the collars used between the saws C, as shown in detached views, Figs. 6, 7, and 8.

Directly over and covering the entire mechanism is a table, $m$, to the under side of and across which are firmly bolted the bars of iron, $n$. These bars $n$ are bent down near the edges of the table $m$, and, reaching to and resting on the top of the bed or table B, form legs or supports for the table $m$, the two back supports, $n'$, being provided with the hinges $r$, which are firmly secured to the table B, so that the table $m$ may be raised up and placed in the position shown in Fig. 4. This table, $m$, serves to keep falling débris and material from coming in contact with the machinery, and also as a table for holding the bolts which are sawed from the slab and placed thereon, ready to be taken by the operator and passed through the lath-saws.

Having fully described my invention, what I claim as new, and desire to secure by Letters Patent, is—

1. In a circular sawing machine having the solid press-roller frame E, located over the saws, and provided with the press-roller P, suitably attached to the front end thereof, the back end being rigidly attached to the shaft F, which is located back of the saws, the combination of the press-roller frame E, and the press-roller P, and shaft F with the clips $p$, substantially as shown, and for the purpose specified.

2. In a circular sawing machine, a shield or guard consisting of a press-roller frame, E, constructed of one solid piece placed over the saws and at an angle inclined forward, and having suitably attached at its front end and under side and in front of the saws the press-roller P, the rear end of the frame being rigidly attached by the clips $p$ to the shaft F, which is located back of and above the saws, all combined to operate substantially as and for the purpose specified.

3. The combination of a circular sawing machine with a pressure-foot placed in the rear of the saws, and consisting of the foot I, the front portion of which is slightly turned up, and the back portion being turned up at right angles with the foot, and provided with a slot, $t$, and secured to the cross-piece H by the bolt $w$, the cross-piece H being provided with the slots $c$, and secured to the standards G by the bolts $f$, all constructed substantially as and for the purpose specified.

4. The combination of a lath-sawing machine with a spreader consisting of a plate R, provided with the slots S and T, the spreader-plates L, between which are placed the dividing-pieces O, and outside of which are placed the pieces O'', and held together by the bolts $d$, and held to the plate R by the bolts $e$, which are attached to the outside pieces, O'', substantially as described and shown.

5. In a circular sawing machine, a table, $m$, located above and covering the entire machinery, and supported by the legs $n'$ and $n''$, which are secured to the under side of the table $m$, as described, the lower end of the legs $n''$ resting on the bed B, and the back legs, $n'$, being secured to the bed B by the hinges $r$, all in combination, and operating substantially as shown, and for the purpose specified.

ARTHUR CARRIER.

Witnesses:
G. H. FRANCIS,
D. W. PARKER.